United States Patent [19]
Zager et al.

[11] Patent Number: 5,552,009
[45] Date of Patent: Sep. 3, 1996

[54] METHOD FOR MAKING OPTICALLY READABLE MEDIA CONTAINING EMBOSSED INFORMATION

[75] Inventors: Stephen A. Zager, Newark; Felix P. Shvartsman, Wilmington, both of Del.

[73] Assignee: U.S. Philips Corporation, New York, N.Y.

[21] Appl. No.: 419,492

[22] Filed: Apr. 10, 1995

Related U.S. Application Data

[62] Division of Ser. No. 719,087, Jun. 19, 1991, Pat. No. 5,466,319, which is a continuation of Ser. No. 375,100, Jun. 30, 1989, abandoned.

[51] Int. Cl.⁶ ..................................... B32B 31/00
[52] U.S. Cl. ........................ 156/220; 156/275.5
[58] Field of Search .................. 156/220, 275.5, 156/289, 272.2

[56] References Cited

U.S. PATENT DOCUMENTS 5,273,598 12/1993 Higasihara et al. ............. 156/275.5 X Primary Examiner—James Engel
Attorney, Agent, or Firm—Norman N. Spain

[57] ABSTRACT

A method for making an optically readable medium containing a relief information track comprising the sequential steps of

(a) laminating a dry photohardenable film to a surface of a transparent dimensionally stable substrate;

(b) embossing the exposed surface of the photohardenable film with the relief information track by applying thereto under pressure a stamper die containing a reverse relief image of the information track;

(c) passing actinic radiation through the transparent substrate and the photohardenable film to effect hardening of the photohardenable film while it is contact with the stamper die; and (d) separating the stamper die from the embossed photohardened film;
The embossed film of the medium is made reflective by applying a reflective layer to either the photohardenable film prior to embossing or to the photohardened film subsequent to embossing.

5 Claims, 4 Drawing Sheets

METHOD FOR MAKING OPTICALLY READABLE MEDIA CONTAINING EMBOSSED INFORMATION

This is a division of application Ser. No. 07/719,087 now U.S. Pat. No. 5,466,318 filed Jun. 19, 1991 which is a continuation of application Ser. No. 07/375,100 filed Jun. 30, 1989 now abandoned.

FIELD OF THE INVENTION

The invention is directed to the manufacture of information-carrying media for use in optical readout systems employing a laser beam. More particularly, the invention is directed to manufacture of such media-carrying coded information which is convertible from reflected optical signals to electrical signals for such varied uses as sound recordings, audio/visual recordings or computer information retrieval systems.

BACKGROUND OF THE INVENTION

Impression and compression molding, which have long been used in the manufacture of analog recordings, have also been used in the manufacture of video and compact discs. In these methods, pre-heated molten plastic is charged to a mold or "stamper" having a relief pattern corresponding to the micron-sized information-carrying pits required in the finished disc. Pressure causes the fluid polymer to flow into the pattern and conform to the stamper relief. Cooling produces a solid disc with the desired signal pattern, thickness and other dimensions required. The embossed discs are then finished by the application of reflecting and protective layers, labeling, etc., by known standard techniques.

U.S. Pat. Nos. 4,363,844 and 4,519,065 describe a closely related process for making video discs and similar devices. The starting composition is not molten plastic, but can be an element comprising a very thin embossable radiation reflective layer overlying an embossable, heat softenable layer which can be simply thermoplastic or can also be radiation curable. Optionally, the heat-softenable composition can be coated on a substrate. The heat-softenable composition is chosen so that its maximum loss modulus is between 30° and 180° C., which allows embossing at 50°–200° C. at pressures of 5–100 kg/cm². These conditions are similar to those used in compression or injection molding techniques for making video and compact discs. Impressing the stamper information into the heat softenable layer can be done with a platen or roll embosser. Radiation curing helps retain the desired relief shape by crosslinking. Discs are provided with the reflective layer before they are impressed with the information carrying relief pattern.

A significant disadvantage with both of the high pressure, high temperature relief-forming methods described above is the potential for image distortion and internal stresses in the discs produced.

As described in the *Journal of Radiation Curing*, a photopolymerization method was developed to help overcome these limitations (A. J. M. van den Broek et al., *Journal of Radiation Curing*, 11, 2–9, 1984). In this method which is frequently referred to as the "2P" process, a measured amount of liquid, low viscosity photopolymerizable acrylate monomer or mixture of acrylate monomers is applied at room temperature to the information-carrying master, spread out uniformly by applying to the liquid layer a flexible film of transparent plastic which is suitable as a permanent disc substrate. After the liquid fully covers the mold in the proper thickness, the liquid composition is photohardened and adhered to the substrate by exposure to ultraviolet radiation through the substrate.

Because the method uses a low viscosity liquid composition, high temperature and pressure are not needed to make the material accurately conform to the stamper. Further, the stampers used need not be as mechanically strong as in compression molding methods which allows the use of lower cost plastic stampers.

In U.S. Pat. No. 4,296,158, mixtures of polyacrylate monomers and heterocyclic group-containing oligomers with terminal unsaturation are spread over a stamper and simultaneously covered with a polymeric film by means of a pressure roll. The film becomes the disc substrate.

In U.S. Pat. No. 4,354,988 a process is described that produces optical discs by combining the steps of spreading photocurable resin on a stamper, covering with substrate film, curing, punching a center hole and trimming, all in a continuous sequence.

U.S. Pat. No. 4,482,511 discloses a similar approach using radiation-sensitive liquid compositions comprised of monomers, oligomers or mixtures thereof. Pressures of less than 1 kg/cm² are needed and high fidelity glass master originals can be used. Means for applying a thin fluoropolymer release layer to the stamper surface is also disclosed.

In U.S. Pat. No. 4,510,593, polymerizable mixtures of mono- and polyunsaturated monomers also containing soluble film-forming polymer binders are described which are applied to a substrate then contacted with a flexible stamper by means of a pressure roll. The presence of the binder is stated to improve the properties of the information-carrying layer. In U.S. Pat. No. 4,430,363, a screen printing method for applying similar radiation sensitive mixtures to the substrate is described. In both of these patents, curing is achieved by exposure through an actinic radiation-transparent stamper.

In U.S. Pat. No. 4,582,885, a fluid, polymerizable oligomer composition containing "hard" and "soft" segments that can be varied to control end-use physical properties is used to prepare a variety of information-carrying articles, including optical discs.

While the liquid compositions described in the above patents and technical article may be fluid enough to conform to the information-carrying stamper relief pattern at room temperature under application pressures much lower than required for compression molding, they nevertheless have certain inherently practical limitations: (1) fluid compositions require a precision mold to contain the liquid; and (2) careful control of the amount of liquid charged during each cycle is required to maintain uniformity of thickness and other critical disc dimensions.

On the other hand, Watkins U.S. Pat. No. 4,790,893 discloses a process for making information carriers such as CD's in which a thermoplastic material layer is extruded at a temperature above its softening point onto a patterned metal master. Pressure is applied to the layer which is cooled and the cooled layer is separated from the metal master. A thin metal film is applied to the patterned layer and the patterned layer is laminated to a substrate.

In prior art elements where the photocurable composition is applied as a layer on a substrate, either before being impressed by the stamper, or if applied to the stamper then contacted by the substrate, careful attention must be paid to the radiation curing step to assure adequate substrate adhesion. Overcuring can lead to excess information layer shrinkage, variable information distorting internal stress or unproductive long exposure times. The alternative would be severe restrictions on the selection of acceptable compatible combinations of substrates and curable compositions.

SUMMARY OF THE INVENTION

In a first aspect, the invention is directed to a method for making an optically readable medium containing a relief information track comprising the sequential steps of:

(a) laminating a dry photohardenable film to a surface of a dimensionally stable optically transparent substrate;

(b) optionally forming a reflective layer on the exposed surface of the dry photohardenable film;

(c) embossing the exposed surface of the photohardenable film with the relief information track by applying thereto under pressure a stamper containing a reverse relief image of the information track;

(d) passing actinic radiation through the transparent substrate and the photohardenable film to effect hardening of the photohardenable film while it is in contact with the stamper;

(e) separating the stamper from the embossed photohardened film; and (f) forming an optically reflective layer on the embossed surface of the photohardened film, if none was formed prior to embossing step (c).

In a second aspect, the invention is directed to a method for making an optically readable medium containing a relief information track comprising the sequential steps of:

(a) applying a reflective layer to one surface of a dry photohardenable film;

(b) laminating the non-reflective surface of the photohardenable film to a surface of a transparent dimensionally stable substrate;

(c) embossing the exposed reflective surface of the photohardenable film with the relief information track by applying thereto under pressure a stamper containing a reverse relief image of the information track;

(d) passing actinic radiation through the transparent substrate and the photohardenable film to effect hardening of the photohardenable film while it is in contact with the stamper; and (e) separating the stamper from the embossed photohardened film.

BRIEF DESCRIPTION OF THE DRAWING

The Drawing consist of three figures.

DETAILED DESCRIPTION OF THE INVENTION

A. Substrate

The substrate functions primarily as a dimensionally stable support for the photohardened information-carrying layer. It may be either rigid or flexible. The substrate may also function as a dust defocussing layer. In both cases, a laser beam passes through the substrate to reflect the encoded signal from the reflective layer. The variation in the reflected laser beam passing back through the substrate is "read" by a detector and converted to a suitable output signal. To function as a suitable substrate, the disc or sheet should (1) be substantially transparent to the "read" laser radiation, (2) be uniformly thick across the entire signal carrying surface area, (3) have minimum birefringence, (4) have a refractive index matched to the photohardened layer, and (5) have a disc geometry suitable for the end use contemplated, e.g., CD-audio, CD-ROM, Video, etc. Current CD-audio optical standards recommend the following:

The thickness of the transparent substrate to be 1.2±0.1 mm, excluding reflection layer, protection layer, and label;

The refractive index of the transparent substrate to be 1.55±0.1 at a wavelength of 780±10 nm;

Maximum birefringence of the transparent substrate to be 100 nm double pass;

The laser beam reflection and double-pass substrate transmission to be 70 to 90 per cent; and Maximum variation of laser beam reflection and double-pass substrate transmission to be 3 per cent across the substrate surface, for frequencies less than 100 Hz and disc rotation at the scanning velocity.

As indicated earlier, optical media geometry and standards may vary depending on the use of the media. Current industry standards for the geometry of compact discs recommend that:

The outer diameter of the disc to be 120±0.3 mm, when measured at 23° C.±2° C. and 50±5% RH, with an eccentricity of at most ±0.2 mm relative to the center hole (largest inner circle);

The outer edge to be free from burrs and may be chamfered or rounded;

The disc weight to be 14 to 33 g;

The center hole to be cylindrical with a diameter of 15.0 to 15.1 mm when measured at 23° C.±2° C. and 50±5% RH.

The hole edge must be free from burrs at the information side of the disc and may be chamfered or rounded; and The thickness of the disc to be 1.1 to 1.5 mm (1.2 mm preferred) including protection layer and label.

The blank substrate can be formulated from a variety of polymeric materials provided that suitable optical criteria are met. Typical of such polymeric materials used are polymethyl methacrylates and polycarbonates and the like. Of these, polycarbonates are preferred for use in single sided disc structures, e.g., compact discs, due to their better dimensional stability during environmental changes. In some instances, glass, quartz or other transparent inorganic materials may be used as the substrate. Typically polymeric materials are preferred due to their low cost and the ease of manufacturing discs therefrom.

Blank disc substrates may be formed by convention molding methods, such as injection molding or injection/compression molding methods or they may be cut or stamped from preformed sheets of the substrate material. In one embodiment of this invention the geometry of the substrate is formed before lamination of the photohardenable layer. In an alternative embodiment, the geometry of the substrate is cut or stamped from sheets of substrate material after the photohardenable layer has been laminated thereto. In the alternate embodiment, it is possible to carry out all the manufacturing steps through application of the label before cutting or stamping the disc geometry from the processed sheet laminate. In the instance when the sheet substrate laminator contains an information track(s) the disc is cut or stamped therefrom in registry with that information track(s).

B. Dry Photohardenable Film

As used herein, the term "dry photohardenable film" or "dry photohardenable layer" refers to a substantially solvent-free polymeric layer having a creep viscosity of about 20 megapoises or greater and preferably between about 100 and 200 megapoises, as measured with a parallel plate rheometer. Such "dry photohardenable layers" are contrasted with conventional liquid photohardenable layers which typically have viscosities of about several hundred poises or less. For the purpose of this invention, viscosity is measured as creep viscosity with a parallel plate rheometer using a Du Pont Model 1090 Thermal Mechanical Analyzer. In this procedure, a 0.036 inch thick sample is placed in contact between two flat discs (about 0.25 inch diameter). A quartz probe which is capable of accepting additional weights is positioned atop the upper disc and the same/disc assembly is maintained at constant temperature of 40° C. and RH of 44% throughout the measurement. Creep viscosity is calculated from the rate of decrease of sample thickness under equilibrated conditions. The 0.036 inch sample is prepared by laminating together sufficient layers of the test film to obtain the desired thickness. The laminate is then cut to provide a circular sample slightly larger in diameter than that of the rheometer plates.

The photohardenable layer is laminated to the substrate as a preformed dry film photohardenable element comprised of a temporary support sheet or web and a uniformly thick dry photohardenable layer releasably adhered thereto. The photohardenable element may be cut sheets or it may be in the form of a rolled web for ease of use and storage. The non-laminated second side of the photohardenable layer may have a removable protective cover film which is removed before use by stripping it off.

Uniformly thick, dry, photohardenable layers useful in this invention typically have a thickness which compliments the thickness of the substrate so that the thickness criteria of the finished product is met, e.g., 1.1 to 1.5 mm for a compact disc. Useful layer thickness range from about 0.0035 mm (0.1 mil) to about 0.13 mm (5 mil) with preferred thickness being below 0.025 mm.

The photohardened layer should be firmly adhered to the substrate surface and should have optical characteristics comparable to those of the surface. Preferably the refractive index of the photohardened layer should match that of the substrate 10±0.1 measured at the read laser wavelength.

The photohardenable layer is a thermoplastic composition which upon exposure to actinic radiation, polymers of higher molecular weight by crosslinking and/or by polymerization. This changes the rheological character of the composition and decreases its solubility in common solvents. Preferred photohardenable compositions are photopolymerizable compositions wherein free radical addition of polymerization and crosslinking of a compound containing one or more ethylenically unsaturated groups, hardens and insolubilizes the composition. The photosensitivity of the photopolymerizable composition is enhanced by a photoinitiating system which may contain a component which sensitizes the composition to practical radiation sources, e.g., visible light. Conventionally a binder is the most significant component of a substantially dry photopolymerizable film or layer in terms of what physical properties the film or laminate will have while being used in the process of the invention. The binder serves as a containing medium for the monomer and photoinitiator prior to exposure, and after exposure contributes to the optical and other physical characteristics needed for the optical media. Cohesion, adhesion, flexibility, miscibility, tensile strength, and index of refraction (IR) are some of the many properties which determine if a binder is suitable for use in an optical media. In practicing the invention dry film photopolymerizable elements of various types may be used such as those disclosed In U.S. Pat. No. 3,469,982; U.S. Pat. No. 4,273,857; U.S. Pat. No. 4,278,752; U.S. Pat. No. 4,293,635; U.S. Pat. No. 4,621,043; U.S. Pat. No. 4,693,959; U.S. Pat. No. 3,649,268; U.S. Pat. No. 4,191,572; U.S. Pat. No. 4,247,619; U.S. Pat. No. 4,326,010; U.S. Pat. No. 4,356,253 and European Patent Application 87106145.3 filed Apr. 28, 1987. All of these are incorporated herein by reference.

Other equivalent dry film photohardenable film elements include photodimerizable or photocrosslinkable compositions such as disclosed in U.S. Pat. No. 3,526,504 or those compositions in which hardening is achieved by a mechanism other than the free radical-initiation identified above.

In general the photopolymerizable compositions useful in carrying out this invention contain an ethylenically unsaturated monomer, a free radical-generating initiating system and a binder.

Suitable monomers which can be used as the sole monomer or in combination with others include the following: t-butyl acrylate, 1,5-pentanediol diacrylate, N,N-diethylaminoethyl acrylate, ethylene glycol diacrylate, 1,4-butanediol diacrylate, diethylene glycol diacrylate, hexamethylene glycol diacrylate, 1,3-propanediol diacrylate, decamethylene glycol diacrylate, decamethylene glycol dimethacrylate, 1,4-cyclohexenediol diacrylate, 2,2-dimethylolpropane diacrylate, glycerol diacrylate, tripropylene glycol diacrylate, glycerol triacrylate, trimethylolpropane triacrylate, pentaerythritol triacrylate, polyoxyethylated trimethylolpropane triacrylate and trimethacrylate and similar compounds as disclosed in U.S. Pat. No. 3,380,831, 2,2-di(p-hydroxyphenyl)-propane diacrylate, pentaerythritol tetraacrylate, 2,2-di-(p-hydroxyphenyl)-propane dimethacrylate, triethylene glycol diacrylate, polyoxyethyl-2,2-di-(p-hydroxyphenyl)-propane dimethacrylate, di-(3-methacryloxy-2-hydroxypropyl) ether of bisphenol-A, di-(2-methacryloxyethyl) ether of bisphenol-A, di(3-acryloxy-2-hydroxypropyi) ether of bisphenol-A, di(2-acryloxyethyl) ether of bisphenol-A, di(3-methacryloxy-2-hydroxypropyl) ether of tetrachlorobisphenol-A, di(2-methacryloxyethyl) ester of tetrachlorobisphenol-A, di-(3-methacryloxy-2-hydroxypropyi) ether of tetrabromo-bisphenol-A, di-(2-methacryloxyethyl) ether of tetrabromo-bisphenol-A, di-(3-methacryloxy-2-hydroxypropyl) ether of 1,4-butanediol, di-(3-methacryloxy-2-hydroxypropyl) ether of diphenolic acid, triethylene glycol dimethacrylate, polyoxypropyltrimethylol propane triacrylate (462), ethylene glycol dimethacrylate, butylene glycol dimethacrylate, 1,3-propanediol dimethacrylate, 1,2,4-butanetriol trimethacrylate, 2,2,4-trimethyl-1,3-pentanediol dimethacrylate, pentaerythritol trimethacrylate, 1-phenyl ethylene-1,2-dimethacrylate, pentaerythritol tetramethacrylate, trimethylol propane trimethacrylate, 1,5-pentanediol dimethacrylate, diallyl fumarate, styrene, 1,4-benzenediol dimethacrylate, 1,4-diisopropenyl benzene, and 1,35-triisopropenyl benzene.

In addition to the ethylenically unsaturated monomers mentioned above, the photohardenable layer can also contain one or more free radical-initiated, chain-propagating, addition-polymerizable, ethylenically unsaturated compounds generally having a molecular weight of at least about 300. Preferred monomers of this type are an alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Especially preferred are those wherein at least one preferably most of such linkages are conjugated with a double bonded carbon, including carbon double bonded to carbon and to such heteroatoms as nitrogen, oxygen and sulfur. Outstanding are such materials wherein the ethylenically unsaturated groups, especially the vinylidene groups, are conjugated with ester or amide structures.

Preferred free radical-generating addition polymerization initiators activatable by actinic light and thermally inactive at and below 185° C. include the substituted or unsubstituted polynuclear quinones which are compounds having two intracyclic carbon atoms in a conjugated carbocyclic ring system, e.g., 9,10-anthraquinone, 1-chloroanthraquinone, 2-chloroanthraquinone, 2-methylanthraquinone, 2-ethylanthra-aquinone, 2-tert-butylanthraquinone, octamethylanthraquinone, 1,4-naphthoquinone, 9,10-phenanthrenequinone, 1,2-benzaanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8, 9,10-tetrahydronaphthacenequinone, and 1,2,3,4-tetra-hydrobenz(a)anthracene-7,12-dione. Other photoinitiators which are also useful, even though some may be thermally active at temperatures as low as 85° C., are described in U.S. Pat. No. 2,760,863 and include vicinal ketaldonyl alcohols, such as benzoin, pivaloin, acyloin ethers, e.g., benzoin methyl and ethyl ethers; α-hydrocarbon-substituted aromatic acyloins, including α-methylbenzoin, α-allylbenzoin and α-phenylbenzoin. Photoreducible dyes and reducing agents disclosed in U.S. Pat. Nos. 2,850,445; 2,875,047; 3,097,096; 3,074,974; 3,097,097; and 3,145,104 as well as dyes of the phenazine, oxazine, and quinone classes; Michler's ketone, benzophenone, 2,4,5-triphenylimid-azolyl dimers with hydrogen donors, and mixtures thereof as described in U.S. Pat. Nos. 3,427,161; 3,479,185; and 3,549, 367 can be used as initiators. Similarly the cyclohexadienone compounds of U.S. Pat. No. 4,341,860 are useful as initiators. Also useful with photoinitiators are sensitizers disclosed in U.S. Pat. No. 3,652,275, U.S. Pat. No. 4,162, 162, U.S. Pat. No. 4,454,218, U.S. Pat. No. 4,535,052 and U.S. Pat. No. 4,565,769.

Suitable binders which are polymeric when employed with polymerizable monomers can be used alone, or in combination with one another include the following: polyacrylate and alpha-alkyl polyacrylate esters, e.g., polymethyl methacrylate and polyethyl methacrylate; polyvinyl esters, e.g.,polyvinyl acetate, polyvinyl acetate/acrylate, polyvinyl acetate/methacrylate and hydrolyzed polyvinyl acetate; ethylene/vinyl acetate copolymers; polystyrene polymers and copolymers, e.g., with maleic anhydride and esters; vinylidene chloride copolymers, e.g., vinylidene chloride/acrylonitrile; vinylidene chloride/methacrylate and vinylidene chloride/vinyl acetate copolymers; polyvinyl chloride and copolymers, e.g., polyvinyl chloride/acetate; saturated and unsaturated polyurethanes; synthetic rubbers, e.g., butadiene/acrylonitrile, acrylonitrile/butadiene/styrene, methacrylate/acrylonitrile/butadiene/styrene copolymers, 2-chlorobutadiene-1,3 polymers, chlorinated rubber, and styrene/butadiene/styrene, styrene/isoprene/styrene block copolymers; high molecular weight polyethylene oxides of polyglycols having average molecular weights from about 4,000 to 1,000,000; epoxides, e.g., epoxides containing acrylate or methacrylate groups; copolyesters, e.g., those prepared from the reaction product of a polymethylene glycol of the formula $HO(CH_2)_nOH$, where n is a whole number 2 to 10 inclusive, and (1) hexahydroterephthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids; nylons or pokyamides, e.g., N-methoxymethyl polyhexamethylene adipamide; cellulose esters, e.g., cellulose acetate, cellulose acetate succinate and cellulose acetate butyrate; cellulose ethers, e.g., methyl cellulose, ethyl cellulose and benzyl cellulose; polycarbonates; polyvinyl acetal, e.g., polyvinyi butyral, polyvinyl formal; polyformaldehydes. Acid containing polymers and copolymers functioning as suitable binder include those disclosed in U.S. Pat. No. 3,458,311 and in U.S. Pat. No. 4,273,857. Amphoteric polymeric binders are disclosed in U.S. Pat. No. 4,293,635.

In one place of or in addition to the polymeric binders listed above particulate thickeners with discrete, orderly orientation can be used such as disclosed in U.S. Pat. No. 3,754,920, e.g., silicas, clays, alumina, bentonites, kalonites, etc.

Other components in addition to those described above can be present in the photopolymerizable compositions in varying amounts. Such components include: plasticizers, antioxidants. optical brighteners, ultraviolet radiation absorbing material, thermal stabilizers, hydrogen donors and release agents.

Optical brighteners useful in the process of the invention include those disclosed in U.S. Pat. No. 3,854,950, incorporated herein by reference. A preferred optical brightener is 7-(4'-chloro-6'-di-ethylamino-1',3',5'-triazine-4'-yl) amino 3-phenyl coumarin. Ultraviolet radiation absorbing materials useful in the invention are also disclosed in U.S. Pat. No. 3,854,950.

Useful thermal stabilizers include: hydroquinone, phenidone, hydroquinone monomethyl ether, p-methoxyphenol, alkyl and aryl-substituted hydroquinones and quinones, tert-butyl catechol, pyrogallol, copper resinate, naphthylamines, beta-naphthol, cuprous chloride, 2,6-di-tert-butyl p-cresol, phenothiazine, pyridine, nitrobenzene, dinitrobenzene, p-toluquinone and chloranil, the dinitroso dimers described in U.S. Pat. No. 4,168,982, incorporated herein by reference, are also useful. Normally a thermal polymerization inhibitor will be present to increase stability in the storage of the photopolymerizable composition.

Hydrogen donor compounds useful in the photopolymer compositions include: 2-mercaptobenzoxazole, 2-mercaptobenzothiazole, etc.; as well as various types of compounds, e.g., (a) ethers, (b) esters, (c) alcohols, (d)compounds containing allylic or benzylic hydrogen cumene, (e) acetals, (f) aldehydes, and (g) amides as disclosed in column 12, lines 18 to 58 of U.S. Pat. No. 3,390,996, incorporated herein by reference.

Compounds which have been found useful as release agents are described in U.S. Pat. No. 4,326,010, incorporated herein by reference. A preferred release agent is polycaprolactone.

Amounts of ingredients in the photopolymerizable compositions will generally be within the following percentage ranges based on total weight of the photopolymerizable layer: monomer, 5–50%, preferably 15–25%, initiator 0.1–10%, preferably 1–5% binder, 25–75%, preferably 35–50%, plasticizer, 0–25%, preferably 5–15%, other ingredients 0–5%, preferably 1–4%.

The temporary support film of the photohardenable film element can be any of a number of films such as those described in U.S. Pat. No. 4,174,216. The primary criteria for the film is that it possess dimensional stability and the surface smoothness and release characteristics needed to laminate a uniform layer of photohardenable composition to the substrate surface without distortion of the layer when the support film is removed as in FIG. 2b. To meet this criteria the cohesive force of the photohardenable layer and its adhesive force to the substrate must be greater than its adhesive force to the temporary support film. A preferred support is polyethylene terephthalate.

A second temporary cover sheet, or interleaf may be placed on the second surface of the photopolymerizable layer to protect it from contaminants during storage in roll or stacked cut sheet form and to prevent blocking of the stored element. If used, the protective cover sheet or interleaf is removed from the surface of the photopolymerizable layer before the layer is laminated to the substrate. Any number of films can be used as the cover film provided the film has a suitable surface smoothness and has less adhesion to the photopolymerizable layer than the layer has to the support film. Suitable protective cover sheets or interleafs include polyethylene, polypropylene, etc.

C. Reflective Layer

In order for the embossed information track to be useful in conventional laser playback systems, incident playback radiation must be reflected from portions of the relief track back into a detector. This is accomplished by applying a layer of reflective material, usually metal, to the embossed surface.

Any conventional means may be used to render the embossed information track reflective. A reflective layer may be deposited on the embossed surface by evaporation of a metal, e.g., aluminum, copper, silver, and the like onto the embossed surface. Alternatively, a reflective metallic, e.g., silver, layer may be deposited electrolessly using conventional methods as disclosed in "The Technology of Aerosol Plate" by Donald T. Levy in Technical Proceedings 51st Annual Convention American Electroplater's Society, June 14–18, St. Louis, 1964, pp. 139–149, and in U.S. Pat. No. 4,639,382, both of which are incorporated herein by reference. A reflective dye layer may also be applied to the embossed surface from a solution using conventional coating methods, e.g., spin coating. An additional method of rendering the embossed surface reflective is by coating the surface with a material other than a dye, e.g., a polymeric material, in which the material has an index of refraction which is substantially different from that of the embossed photopolymerized layer for the incident playback radiation.

When the embossed surface of the medium has been rendered reflective, the medium is then playable provided it has the physical dimensions needed for the playback system, e.g., prepared from a preformed substrate. Although playable, the reflective surface at the embossed layer interface is susceptible to damage and environmental degradation unless protected by a cover layer.

D. Protective Layer

Figure 2A:
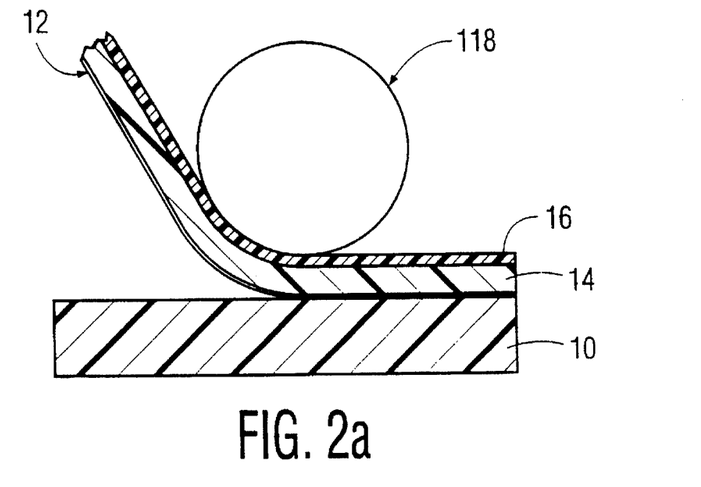
FIGS. 2a–2g depict a more detailed schematic description of the medium elements and the process steps used in this invention.
Figure 2B:
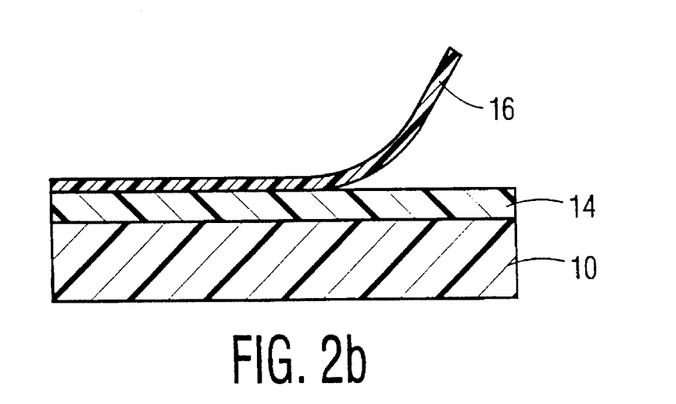
Figure 2C:
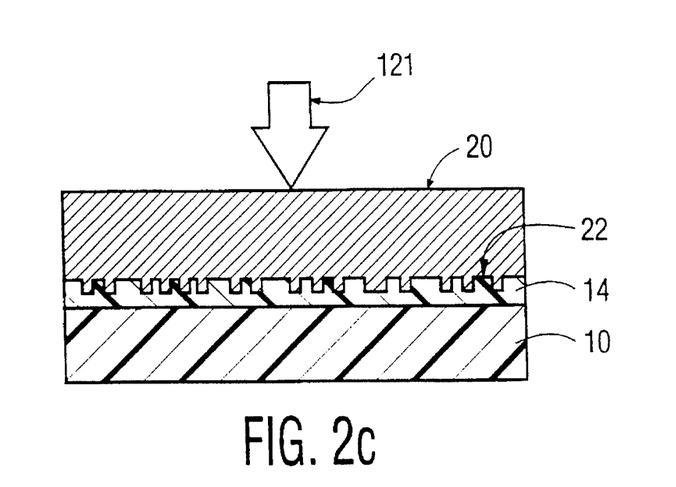
Figures 2D, 2E:
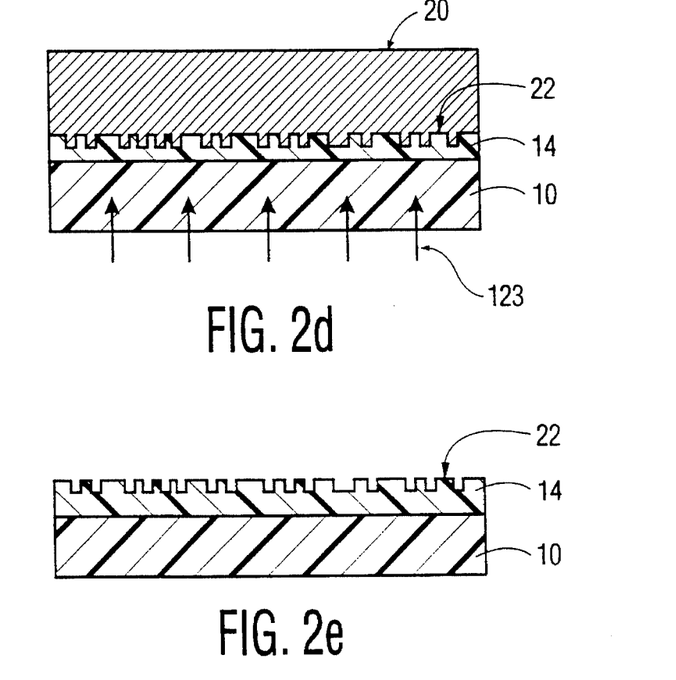
Figure 2F:
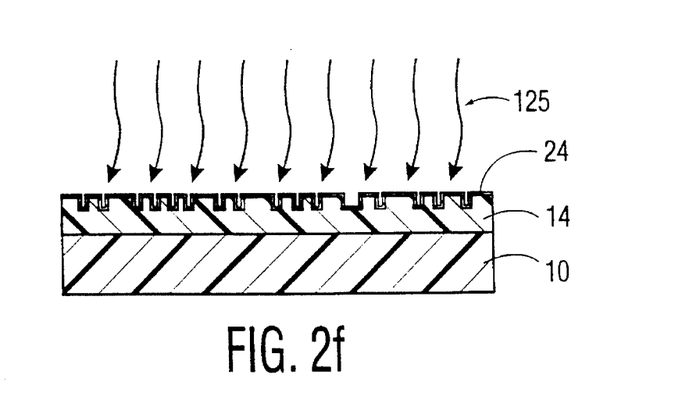
Figure 2G:
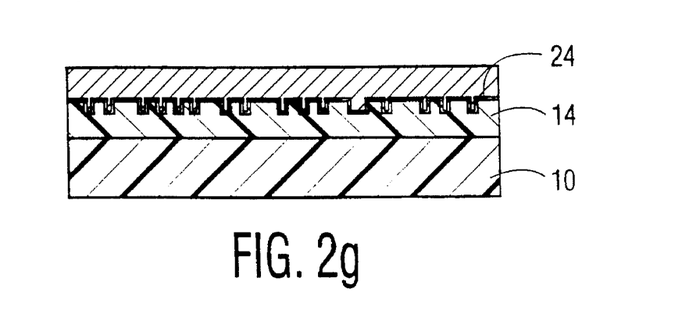

Typically a protective layer is applied over the reflective surface as in FIG. 2G, and an appropriate label printed therein. An embodiment of this invention includes the simultaneous processing of a number of blank discs moving abreast through each step. The number processed simultaneously will ordinarily be limited by the practical photohardenable web width and other apparatus constraints.

In the instance when the reflective layer consists of a sufficiently thick, and tough material, e.g., a polymeric material, the reflective layer itself may be sufficient to protect the reflective interface. Typically, however, a separate layer is applied over the reflective layer for protection and to serve as a surface for subsequent labeling.

The protective layer may be any polymeric film or layer or combination of such which can be adhered to seal the reflective layer and provide a printable abrasion resistant outer surface. The thickness of such a layer or composite may vary provided the overall thickness and weight of the resulting media remain within the required system criteria, e.g., for compact discs between 1.1 to 1.5 mm thick and between 14 and 33 g. Conventionally, a solution of lacquer, such as nitrocellulose, is spin coated over the reflective layer but other preformed layers or films may be used. The preformed layer or film may be a laminatable or adherent curable layer, e.g, a heat or photocurable layer or may be a film, e.g., polyethylene terephthalate, which is adhered to the reflective layer with an adhesive layer. Suitable structured elements and processes suitable for use in protecting the reflective layers include those disclosed in U.S. Pat. No. 4,077,830 and assignees U.S. patent applications, Ser. No. 077,497, filed Jul. 24, 1987 and Ser. No. 031613, filed Mar. 30, 1987 each of which is incorporated herein by reference.

Embossing

After removing the temporary support the surface of the photohardenable layer is embossed with an information track by pressing at room temperature an embossing die or stamper bearing on its surface the negative of the information track in the form of lands and pits. While simple hand pressure is sufficient to embed the stamper surface into the photohardenable layer, use of a press is preferred where uniform high pressure across the surface can be applied momentarily to insure complete conformity of the layer surface to the stamper surface. Similarly, the stamper can be uniformly embedded into the photohardenable layer by passing the aligned laminate/stamper through the nip of a pressure roll laminator, followed by the use of a press. After the stamper's negative image track has been uniformly embedded in the photohardenable layer, pressure may be relaxed or removed and the photohardenable layer then exposed to actinic radiation passing through the transparent substrate. Alternatively, high pressure may be maintained during actinic exposure.

The embossing die or stamper may be any conventional stamper used in the manufacture of such media as compact disc or video disc. Such stampers are prepared by methods well known in the art, such as in U.S. Pat. No. 4,474,650 which is incorporated herein by reference. In addition, the stamper itself may be a photopolymerized element prepared, for example, by the process of this invention, as follows:

The method of making such photohardened stampers is comprised of the following sequence of steps:

(a) applying an optically transparent dry photohardenable film to a surface of a dimensionally stable substrate;

(b) embossing the exposed surface of the photohardenable film with the surface of a relief information track;

(c) passing actinic radiation through the dry photohardenable film to effect hardening of the film while it is in contact with the relief information track;

(d) separating the photohardened film from the relief information track; and (e) using the embossed photohardened film as a stamper in the method of claim 1.

Furthermore, the stamper may be a high resolution photomask having an opaque metal relief image layer, e.g., chromium, supported on a substrate such as glass of quartz. A flexible substrate can also be used. This stamper is prepared in a conventional manner by using positive-acting electron beam resist materials, etc. as described in Bowden, et al., J. Electrochem. Soc., Solid-State Science & Technology, Vol. 128, No. 6, pp. 1304–1313.

The substrate may be either rigid or flexible so long as it is dimensionally stable and preferably transparent to actinic radiation.

When the stamper is made from a photopolymerized element, it is preferred that a release coating be placed on the embossing surface to facilitate release of the stamper from the embossed medium. Various materials can be used for this purpose, among which are metals such as aluminum and chromium and organic polymers having a low surface energy such as fluoropolymers. The metals can be coated by sputtering and the polymers can be coated by either sputtering or by plasma polymerization.

While the stamper typically is a flat embossing die, it may also be an embossing roll, wherein the roll has one or more negative information tracks along the length of its surface. Such embossing rolls are particularly useful when simultaneously embossing and exposing laminated sheet substrate as in FIG. 3. In this instance, the photohardenable layer is exposed to actinic radiation just after the nip of the roll imbeds a segment of the negative information track into the layer with sufficient intensity to fix the dimensions of the information track in the photohardenable layer before the roll surface detaches from the embossed element. Further treatment may then be applied to completely cure or harden the embossed photohardened layer.

In the instance when preformed substrates are used, e.g., having a disc structure, the sheet support is removed and the stamper is centered over the laminate structure, e.g., using a cylinder in the annular hole of a disc. Shim structure may be provided around the laminate structure to insure surface thickness limitations are met. The centered stamper is then pressed into the photohardenable surface by a mechanical or hydraulic press for the required duration. The photohardenable layer may be exposed to actinic radiation as in FIG. 2D while pressure is applied or the laminate/stamper composite may be removed and placed in a conventional radiation source. After photohardening is complete to the extent that the information track is fixed in place, the stamper may be removed from the composite to give a laminate photohardened structure having an embossed surface containing the information track as in FIG. 2E. If further curing is required to completely harden the layer any convenient means may be used, e.g., further actinic exposure, heat treatment, electron beam, etc.

F. Label Application

Any conventional method may be used to apply a label to the protective surface of the reflective media. Typically four color labels are printed individually onto the protective surface of each media using an offset printing process. In the instance where a blank sheet substrate has been used to produce an array of information tracks (media) within the confines of the sheet, the protective surface of the entire sheet array can be printed with a registered array of labels using conventional printing processes including flexography and offset processes. Alternatively, each media section of the array may be printed individually by a conventional step printing process.

Using a negative working peel-apart element and process disclosed in the aforementioned U.S. Pat. No. 4,247,619, a label bearing protective layer composite can be applied to the reflective layer. In this instance the tacky layer of an element comprising in order a tacky layer, a photopolymerizable layer and a strippable cover film, e.g., Cromalin® C4/CN proofing film, is laminated to the free surface of the reflective layer. The laminate is then exposed to actinic radiation through a mask containing a negative image of the label, the coversheet with exposed areas adhered thereto is stripped from the laminate, and uncovered tacky image areas are toned with dry toner powder, e.g., black. If a full color label is required, the procedure is repeated 3 additional times using suitable matched color separation masks and the corresponding toners, e.g., yellow, magenta, and cyan toner powders. Finally a fifth element is laminated to the last toned surface and uniformly exposed to actinic radiation to produce a photoadhered protective surface of the cover sheet, e.g., polyethylene terephthalate. In those instances where the label is to be applied in a different manner, only the fifth step is required to seal and protect the reflective layer of the embossed media.

G. Lamination

The photohardenable layer can be laminated to the surface of the substrate using any conventional laminating system. Suitable systems for applying a dry film to a substrate include hot roll laminators or laminators with a heated platen or shoe as disclosed in U.S. Pat. No. 3,469,982; U.S. Pat. No. 3,547,730; U.S. Pat. No. 3,649,268 and U.S. Pat. No. 4,127,436 each of which is incorporated herein by reference. Useful laminating systems wherein a liquid is used to enhance adhesion include those disclosed in U.S. Pat. No. 3,629,036; U.S. Pat. No. 4,069,076; U.S. Pat. No. 4,405,394 and U.S. Pat. No. 4,378,264 each of which is incorporated herein by reference. Particularly useful are commercial hot roll laminators, e.g., Du Pont Cromalin® Laminator and Du Pont Riston® Hot Roll Laminator and Laminator, Model 100.

In the laminating step of this invention the protective cover sheet or interleaf, if present, is first removed from the photohardenable layer and the layer is applied to the surface of the substrate under pressure and typically with heat so that interfacial air is removed and void free adhesion between the substrate and the layer is effected. Preferably a hot roll laminator is used to effect such void free adhesion.

In those instances where a preformed substrate is used, e.g., a blank disc, a carrier sheet may be used to carry each preformed substrate or an array of substrates into and through the nip of the laminator to prevent contamination of the rear surface of each substrate. Ordinary paper sheets or webs are suitable as a carrier sheet provided they are lint free and likewise free of contaminants. A suitable carrier sheet is Cromalin® Masterproof Commercial Receptor, Du Pont product CM/CR or other like material. Also in those instances where preformed substrates are used excess areas of the photohardenable element are cut from the edges of the laminated substrate, e.g., from the edges and hole of a laminated preformed disc. In those instances where the adhesive/cohesive forces are carefully balanced, trimming of excess photohardenable material from the laminate may be effected by peeling the support sheet therefrom with excess material adhering thereto.

H. Medium Configuration

As illustrated previously the shape of the medium, e.g., disc, may be formed before the process of this invention by conventional molding, stamping or cutting processes or the shape may be formed by cutting or stamping the media from the sheet array. This forming of the media shape from a sheet array typically would occur after the labeling step wherein each medium would be cut or stamped in register with the information track therein, from the sheet array. However the media can be removed from the sheet array in the same manner, once the information track has been embossed in the media area of the sheet. In this instance, each embossed medium would be further processed as an individual piece. Similarly, the shape of the medium may be formed between any of the intervening steps of the process.

Although the shape of the medium may be formed with its final lateral dimensions as indicated above, one or more trimming steps may be introduced to form final dimensions from an outsized medium or blank provided the initial dimensions are greater than those specified. This trimming step may be particularly useful, for instance, in cutting or punching the precise center hole in registration with the information track of a circular disc medium.

The advantageous properties of the lamination and embossing process of this invention can be observed by reference to the drawings and to the examples which follow.

Figure 1:
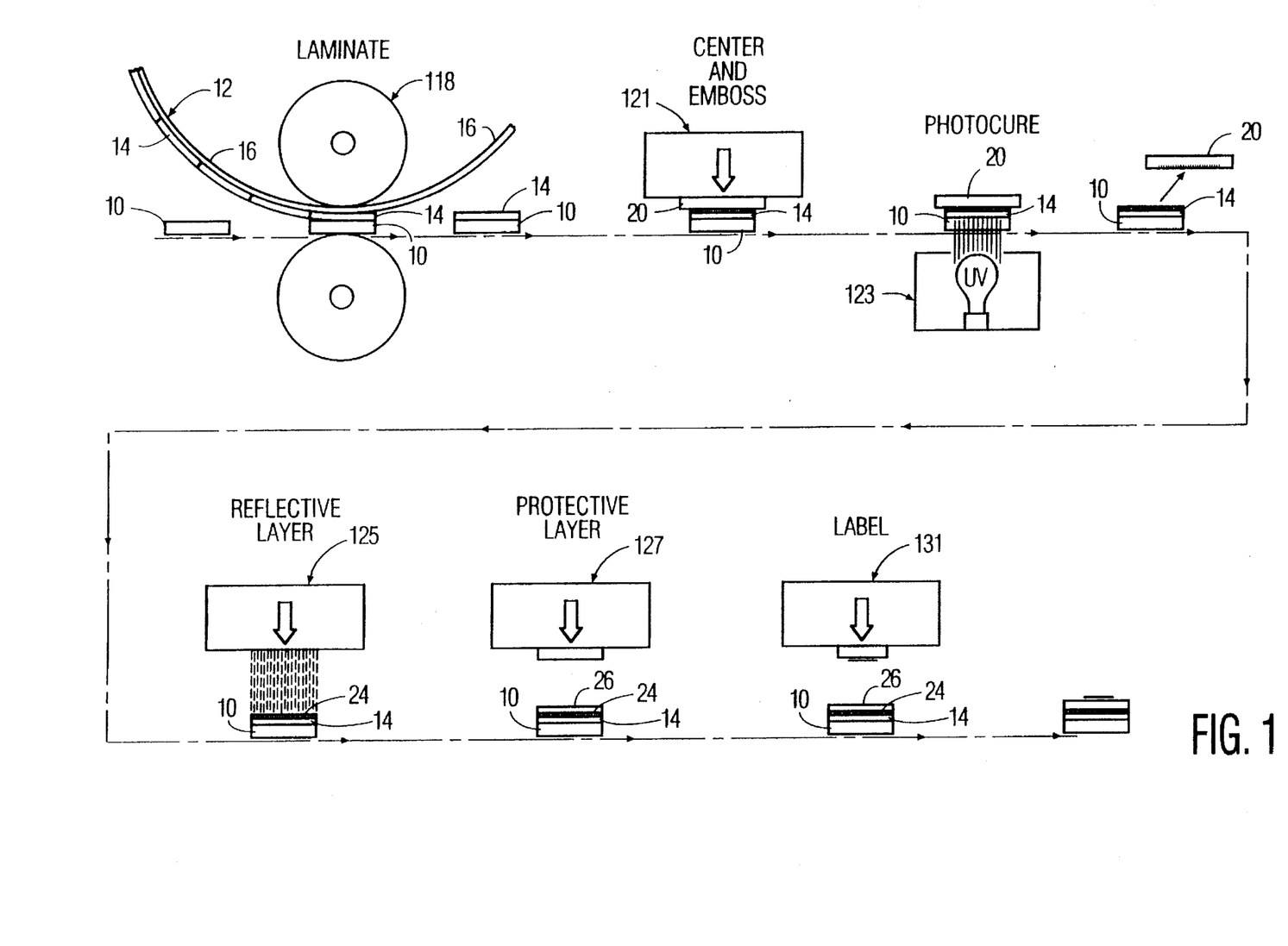
FIG. 1 depicts schematically the steps of this invention used for preparing an optically readable disc medium.

Referring to FIGS. 1 and 2 of the Drawing, a preformed blank disc substrate 10 on a carrier sheet is introduced into the nip of a roll laminator 118 along with a sheet or web of a dry photohardenable film element 12 whereby the photohardenable layer 14 is laminated to the flat surface of the blank disc using heat and/or pressure as in FIG. 2a. After trimming extraneous photohardenable film 12 from the edges of the disc 10, the temporary support film 16 of the photohardenable element 12 is removed as in FIG. 2b. An embossing die or stamper 20 is positioned in registry with the trimmed laminated element and then pressed into the surface of the photohardenable layer 14 as in FIG. 2c using pressure means 121 to form an embossed surface 22.

Before the stamper 20 is removed from the embossed surface 22, the photohardenable layer 14 is photohardened as in FIG. 2d by exposure to actinic radiation passing through the disc substrate 10 from a radiation source 123. Any source of actinic radiation can be used to expose and cure the layer provided the source is matched to the photohardenable system being used. Photopolymerizable and photocrosslinkable systems typically are sensitive to radiation in the near ultraviolet light range and into the visible portion of the spectrum. The primary requirement of the actinic radiation/photohardenable system is that the radiation used be capable of initiating hardening in the system and that residual initiators in the photohardened layer do not adversely interfere with read-out during playback of the media. Encompassed in the process of this invention are ultraviolet and visible radiation, particularly in the near ultraviolet region. The source of actinic radiation may be any of a number of commercially available systems, e.g., Douthitt VIOLUX© metal halide light system, Olec OLITE© halide printing light, and the like, or may be a dedicated system manufactured from conventional components.

After photohardening or curing is complete, the stamper 20 is removed from the embossed surface 22 to produce an embossed disc as in FIG. 2e having an information track(s) of spaced pits and lands.

In order for the embossed information track to be useful in conventional laser playback systems, incident playback radiation must be reflected from portions of the relief track back into a detector. This is accomplished by applying a layer of reflective material, usually metal, to the embossed surface. To the photohardened embossed surface of the disc, a reflective layer 24 is applied as in FIG. 2f using application means 125. Alternatively, the reflective layer can be applied just prior to the embossing step. At this point in the process, the disc may be used in a suitable player to convert the information track(s) into the desired signal.

When the embossed surface of the medium has been rendered reflective, the medium is then playable provided it has the physical dimensions needed for the playback system, e.g., it was prepared from a preformed substrate. Although playable, the reflective surface at the embossed layer interface is susceptible to damage and environmental degradation unless it is protected by a cover layer.

Referring to FIG. 1, a protective layer 26 is applied by means of laminator or coater 127 over the reflective surface as shown in FIG. 2g, and an appropriate label is printed thereon by means of applicator 131. An embodiment of this invention includes the simultaneous processing of a number of blank discs moving abreast through each step. The number processed simultaneously will ordinarily be limited by the practical photohardenable web width and other apparatus constraints.

Figure 3:
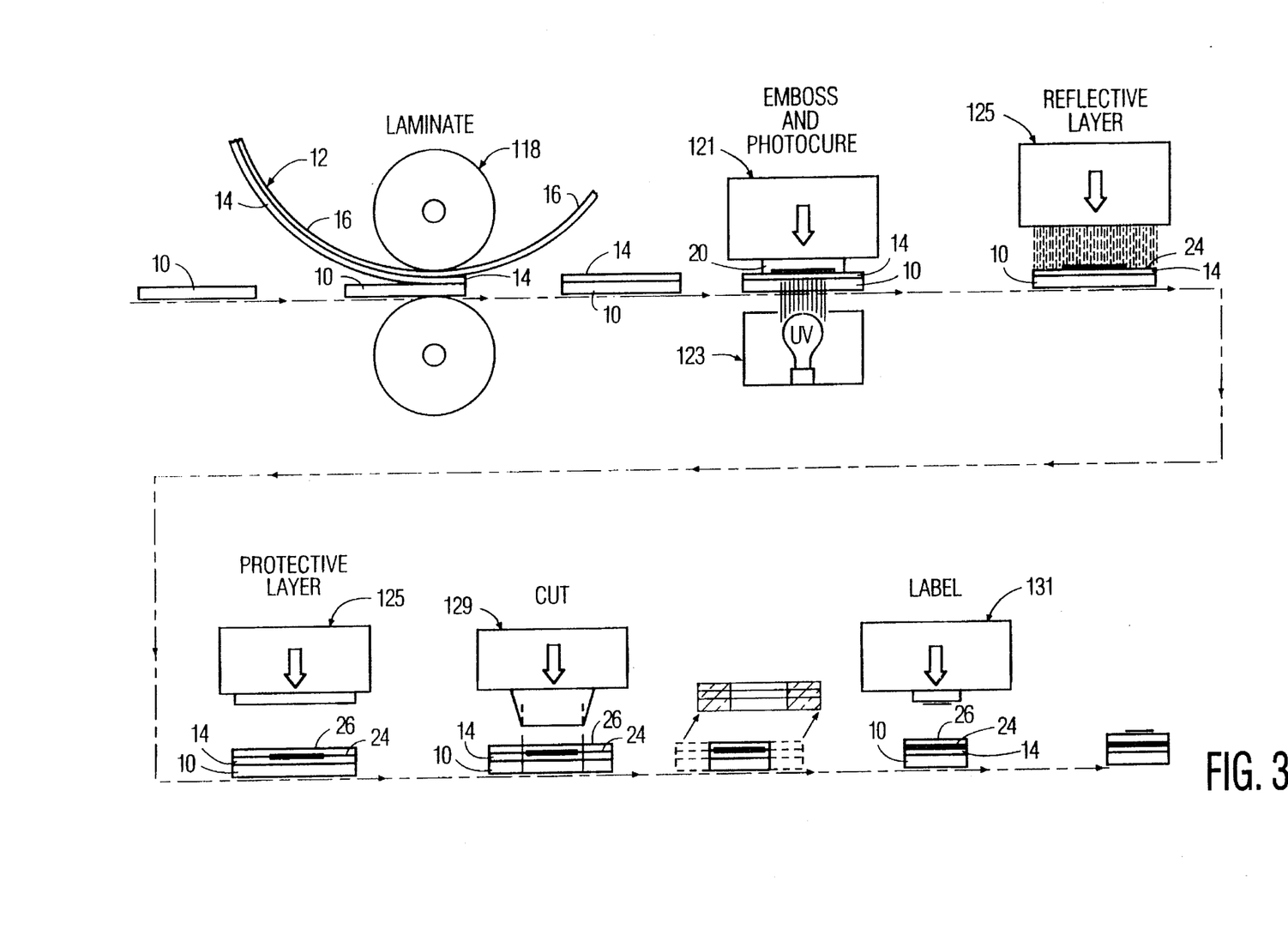
FIG. 3 depicts schematically an in-line manufacturing embodiment of this invention using blank sheet substrates wherein the discs are cut from the sheet after the lamination step.

Turning now to FIG. 3 of the Drawing, an alternative embodiment of the process of this invention is depicted wherein a single blank sheet is used to prepare several discs. In this embodiment, a blank sheet substrate 10 is introduced into the nip of a roll laminator 118 along with a sheet or web of a dry photohardenable film element 12 wherein the photohardenable layer 14 is laminated and adhered to the top surface of the blank sheet substrate 10. After lamination, the temporary support film 16 of the photohardenable element 12 is removed. An embossing die or stamper 20 is positioned in register over a portion of the laminated sheet with a light source 123 positioned thereunder. The stamper 20 is then pressed into the surface of the photohardenable layer 14 to form an embossed surface followed immediately by exposure to actinic radiation to photoharden or cure the layer 14 before the stamper 20 is removed. After exposure, the stamper 20 is removed and along with the radiation source 123 moves to another portion of the laminated sheet whereupon the embossing and exposure steps are repeated. This step-embossing/exposure procedure may be used repeatedly to form disc information tracks on the remaining portions of the laminated sheet. Alternatively, an array of stampers 20 may be used in conjunction with a suitable radiation source(s) 123 simultaneously to form disc information tracks in a number of portions of the photohardenable layer 14 of the sheet laminate. The array may cover the entire useable portion of the sheet substrate or may be a linear array across the width of the sheet which is then stepped along the length of the sheet laminate. To the photohardened embossed surface of the sheet element a reflective layer 24 is applied by means of laminator or coater 127 followed by application of a protective layer 26 to form an array of disc information tracks on the sheet. Either before application of the protective layer or preferably after, each disc is cut or punched from the array in registry with the information track therein by means of an appropriate punch or cutter 129. A label is applied to the sheet or uncut disk by means of applicator 131. While this invention is primarily directed to manufacture of disc-shaped optical media, it can also be used for other media configurations such as cards, webs, tapes, drums or other such shapes providing the required laser signal path.

EXAMPLES

Example 1

This example illustrates the preparation of optically readable media using pre-formed substrates as shown in FIG. 1 of the Drawing.

The substrate, which serves as a dust-defocussing layer and provides mechanical support, was a 1.2 mm thick, 120 mm diameter injection/compression-molded polycarbonate disc with a 15 mm cylindrical center hole.

The embossable layer was applied to the substrate in the form of a dry film by hot roll lamination. A dry film photopolymer element was prepared by machine coating the photopolymerizable composition described below onto 12.7 micron (0.0005 inch) polyethylene terephthalate film; a 25.4 micron (0.001 inch) polyethylene film was used as a temporary interleaf.

The composition of the dry film photopolymer element was as follows:

| INGREDIENT | Amount g |
|---|---|
| Diacrylate ester of bisphenol A epoxy resin derived from bisphenol A and epichlorohydrin viscosity (25° C.) = 1,000,000 cps | 18.48 |
| Trimethylolpropanetrimethacrylate | 13.66 |
| Optical brightener[1] | 2.06 |
| 2-Mercaptobenzoxazole | 0.83 |
| 2,2'-Bis-(o-chlorophenyl)-4,4',5,5' tetraphenylbiimidazole | 1.71 |
| Trimethylolpropane | 5.08 |
| Glycerol triacetate | 6.75 |
| Methoxyhydroquinone | 0.022 |
| Thermal inhibitor[2] | 0.05 |
| Diethylhydroxylamine | 0.09 |
| Ethyl acrylate (57%)/methylmethacrylate- (39%) acrylic acid (4%) copolymer MW = 192,000; Acid No. = 57; Tg = 33° C. | 18.06 |
| Ethyl acrylate, Acid No. = 63; Tg - 14° C. viscosity (25° C.) = 2,000,000 cps; MW = 7,000 | 5.40 |
| Ethyl acrylate (17%)/methylmethacrylate- (71%)/acrylic acid (12%) copolymer MW = 200,000; ACID NO. = 100; TG = 80° C. | 25.15 |
| Polycaprolactone MW = 15,000; M.P. = CO°C.; TG = CO°C. | 0.20 |
| Zinc acetylacetonate (2.45 grams) dissolved in 37.0 grams of methanol | 39.45 |

[1]7-(4'-Chloro-6'-diethylamino 1',3',5'-triazine 4'-yl)amino 3-phenyl coumarin
[2]1,4,4-Trimethyl-2,3-diazobicyclo-(3.2.2)-non-2-ene-2,3-dioxide.

To support the disc during lamination, it was placed on a temporary carrier sheet of commercial color proofing receptor (Cromalin® Masterproof Commercial Receptor, Product No. CM/CR, E. I. Du Pont de Nemours and Company, Inc., Wilmington, Del.). The dry film was laminated to the substrate using a Cromalin® laminator (Du Pont, Wilmington, Del.) operating at a roll surface temperature of 115°–124° C. Lamination covered the disc surface uniformly and sealed it around the edges to the carrier sheet; the disc was cut out with a razor blade and the laminated film cut away from the center hole.

Information was transferred to the laminated disc by embossing the dry film layer with a conventional nickel-shell stamper of the type used for making polycarbonate discs by injection/compression molding. Bumps and spaces on the stamper were 0.9 to 3.3 microns long, approximately 0.1 micron high and 0.6 micron wide. The normal outer diameter mold profile of about 1 mm present in such stampers was removed by means of a 119 mm diameter shear punch to achieve better outer edge contact during embossing. The polyester cover sheet was removed from the laminated disc. To center the stamper, a centering pin was first inserted into the disc center hole. The stamper was then concentrically fitted to the disc using the same pin. A sandwich was made by pressing the stamper onto the information layer with finger pressure. The tackiness of the layer held the stamper in place and the centering pin was removed. The sandwich was then placed between aluminum shims to accommodate the stamper mold profile and protect the sandwich from the press platens. The sandwich was loaded at room temperature into a 40,000 lb. (18.1 metric ton) capacity hydraulic platen press with 20.3×20.3 cm die space, 102 mm diameter ram and manual lever action (Pasadena Hydraulics, Inc., Pasadena, Calif.). The load was quickly increased to full capacity, corresponding to a pressure of 2,000 lbs/in$^2$ (141 kg/cm$^2$) based on 20 sq. in. (129 cm$^2$) sandwich area. The load was released after 2–3 sec. dwell time and the assembly removed from the press.

The embossed information layer was then firmly bonded to the substrate and the embossing made permanent by ultraviolet radiation exposure. The stamper-substrate sandwich, with the transparent substrate facing the light source, was placed atop the vacuum frame 63.5 cm. from the source in a high intensity ultraviolet exposure unit. After a 10 second exposure, the stamper was removed by flexing the assembly slightly. By means of a microscope, the embossed surface was inspected. It was clear that stamper information had been transferred to the photopolymer layer with good fidelity.

The thusly hardened information layer was metallized by sputtering thereon 800–1000Å of aluminum using standard procedures known in the art. After metallization, the disc was played on a conventional audio compact disc player wherein it reproduced sound equivalent to commercial injection/compression-molded discs.

To protect the surface, a dry film lamination process was used. Commercial Cromalin® negative color proofing film (product code C4/CN, Du Pont, Wilmington, Del.) applied using a carrier sheet and hot roll lamination as described above except for use of a roll temperature of 99°–107° C.

Example 2

Example 1 was repeated except that embossing was carried out by using only hand pressure, rather than a hydraulic press. Microscopic inspection after the exposure step showed good information transfer from the stamper.

Example 3

The substrate, which serves as a dust-defocussing layer and provides mechanical support, was 150 mm (6 in.) square and 1.2 mm thick, cut from extruded polycarbonate sheet (Makrolon® OD. Roehm Gmbh, Darmstadt, West Germany).

The embossable information layer was applied to the substrate in the form of a dry film by hot roll lamination. A dry film photopolymer element was prepared as in Example 1.

To support the substrate during lamination, it was placed on a temporary carrier sheet of commercial color proofing receptor as in Example 1. The dry film was laminated to the substrate using a Cromalin® Laminator as in Example 1. Lamination covered the substrate surface uniformly and sealed it around the edges to the carrier sheet; the substrate was cut from the carrier sheet with a razor blade.

Information was transferred to the laminated substrate by embossing the dry film layer with a flat, holeless nickel-shell stamper of the type used for making polycarbonate discs by injection/compression-molding. Lands and bumps on the stamper were 0.9–3.3 µm long, approximately 0.1 µm high, and 0.6 µm wide.

The polyester cover sheet was removed from the laminated substrate. The stamper was laminated to the information layer of the laminated substrate in a Cromalin® Laminator operating at room temperature. The sandwich was then placed between polycarbonate shims to protect the sandwich from the press platens. The sandwich was loaded at room temperature into a 50,000 lb. (23 metric ton) capacity hydraulic press with 23-×23-cm platens, 17-cm ram stroke, and manual lever action (Model M Laboratory Press, Fred S. Carver, Inc., Menomonee Falls, Wis.). The load was quickly increased to 40,000 lb., corresponding to a pressure of 1300 lb./in.$^2$ (92 kg/cm$^2$) based on 30 in.$^2$ (190 cm$^2$) sandwich contact area. The load was released after 1–15 s dwell time, and the shimmed sandwich was removed from the press. The shims were then removed from the sandwich.

The embossed information layer was then firmly bonded to the substrate and the embossing made permanent by ultraviolet radiation exposure. The stamper-substrate sandwich, with the transparent substrate facing the light source, was placed approximately 36 cm (14 in.) from the source in a high intensity ultraviolet exposure unit (5 kW OLITE Printing Light, Model AL53-M, Olec Corp., Irvine, Calif.). After a 30-s exposure, the stamper was removed by flexing the assembly slightly. The embossed surface was inspected with a microscope. It was clear that stamper information had been transferred to the photopolymer layer with good fidelity.

The hardened information layer was metallized by sputtering thereon 800–1000Å of aluminum using standard procedures known in the art.

To protect the aluminum surface, a dry film lamination process was used. Commercial Cromalin® negative color proofing film (product number CM/CN, E. I. Du Pont de Nemours & Co., Inc., Wilmington, Del.) was applied using a carrier sheet and hot roll lamination as in Example 1. The laminated substrate, with the dry film protection layer toward the source, was then given a 30-s ultraviolet exposure as described above. This exposure causes the dry film protection layer to adhere to the aluminum surface and encapsulates the embossed information.

The disc outer diameter (120 mm), located correctly with respect to the embossed information, was punched from the square sheet. Then, the center hole (15 mm), located correctly with respect to the embossed information. was punched from tile disc.

The dry film protection layer was printed with a three-color label using standard procedures known in the art.

The resulting disc was played on an audio compact disc player whereupon it reproduced sound equivalent to commercial injection/compression-molded discs.

We claim:

1. A method for making a stamper for use in making an optically readable medium comprising the sequential steps of:

(a) laminating an optically transparent dry photohardenable film to a surface of a dimensionally stable substrate;

(b) embossing the exposed surface of the photohardenable film with the surface of a relief information track;

(c) passing actinic radiation through the photohardenable film to effect hardening of the photohardenable film while it is in contact with the relief information track; and (d) separating the resultant photohardened stamper from the relief information track.

2. The e method of claim 1 in which a release layer is applied to the photohardened film prior to step (d).

3. The method of claim 2 in which the release layer is either Al or Cr.

4. The method of claim 2 in which the release layer is a low surface energy solid organic polymer.

5. The method of claim 4 in which the low surface energy solid organic polymer is a fluoropolymer.

\* \* \* \* \*